Patented July 22, 1924.

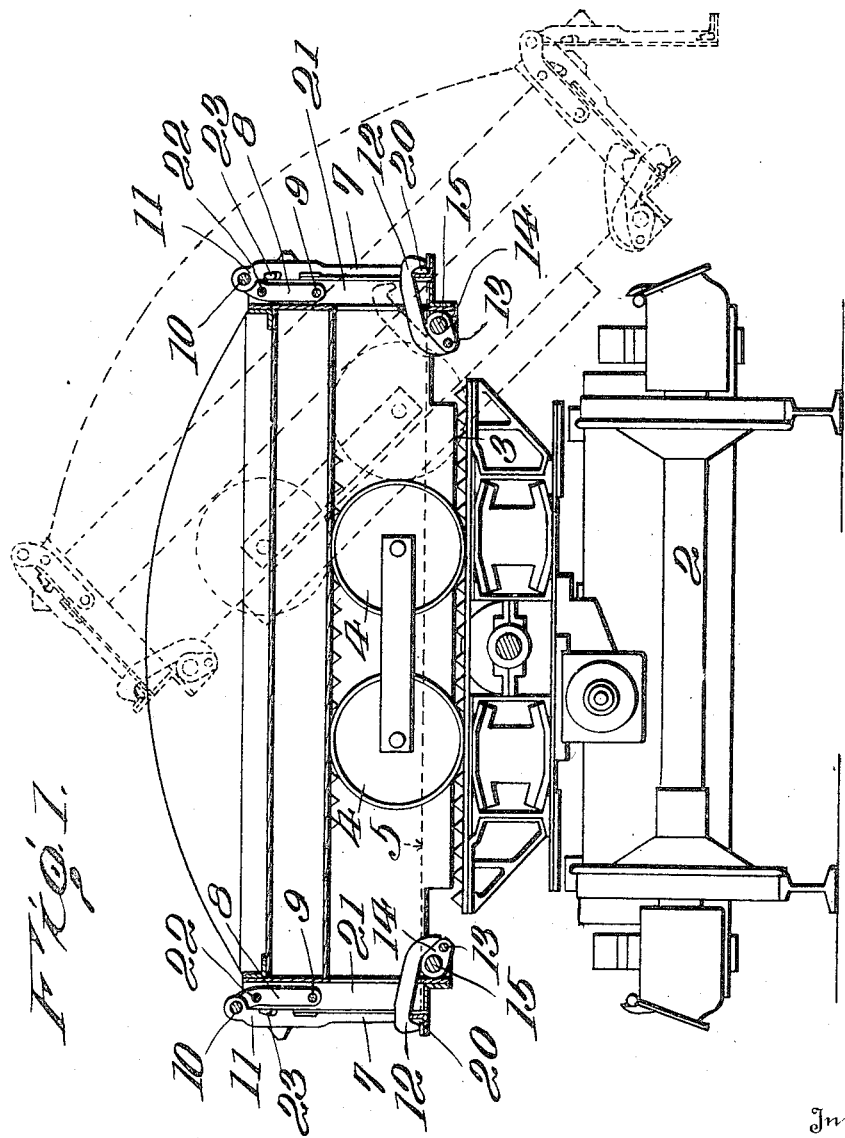

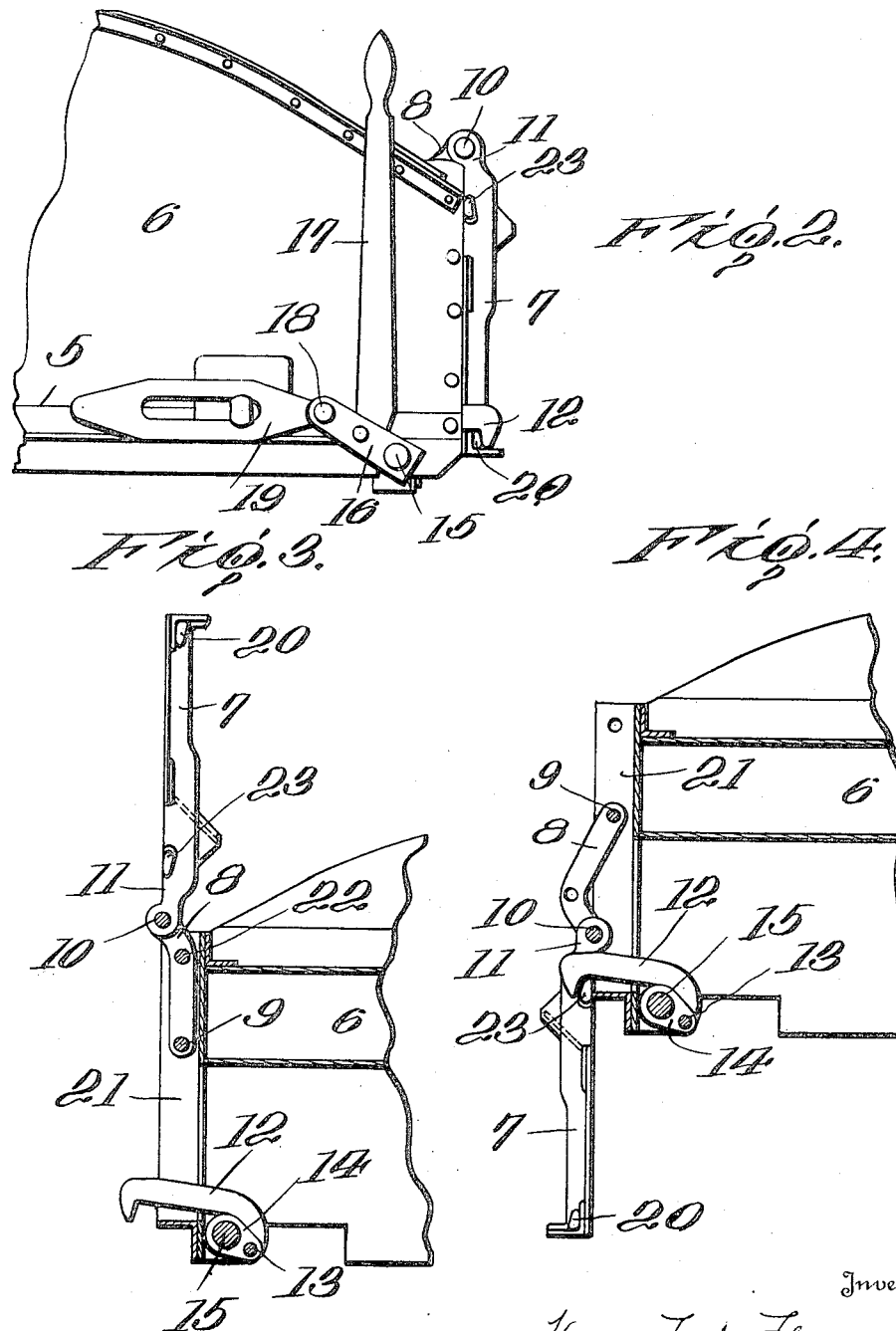

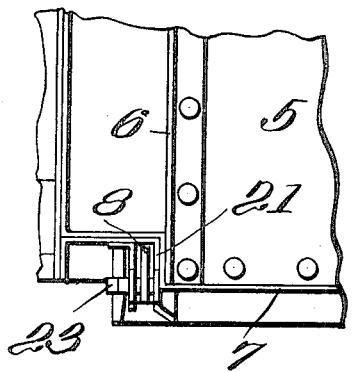
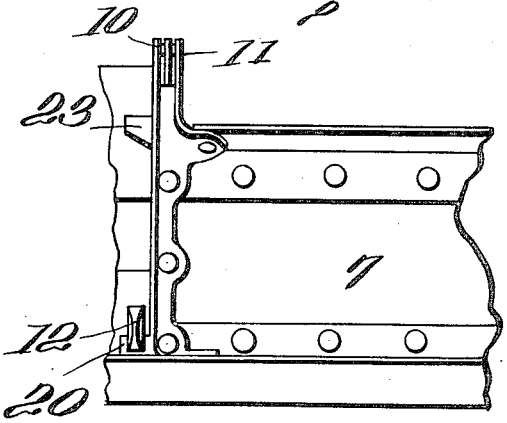
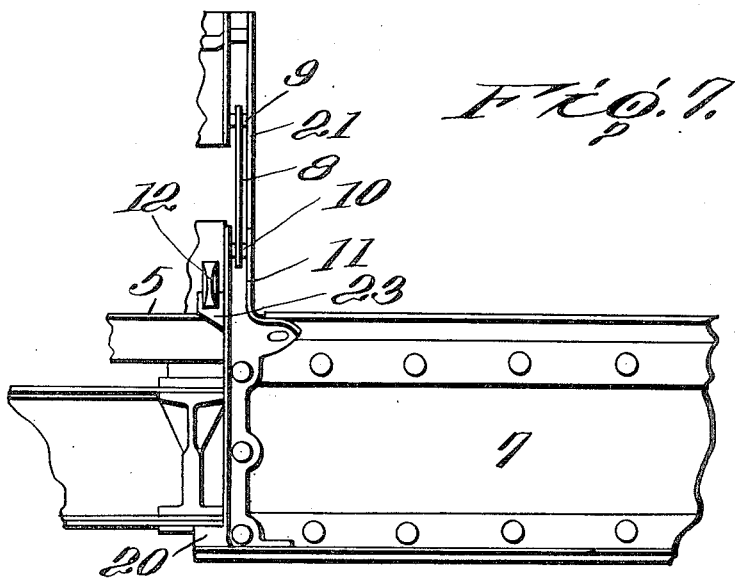

1,502,302

UNITED STATES PATENT OFFICE.

HENRY FORT FLOWERS, OF FINDLAY, OHIO.

DUMP CAR.

Application filed June 2, 1923. Serial No. 643,110.

*To all whom it may concern:*

Be it known that I, HENRY FORT FLOWERS, a citizen of the United States, residing at Findlay, in the county of Hancock, State of Ohio, have invented certain new and useful Improvements in Dump Cars, of which the following is a description, reference being had to the accompanying drawing and to the figures of reference marked thereon.

The invention relates to new and useful improvements in dump cars, and more particularly to a dump car wherein the body portion is adapted to be tilted for dumping the contents of the car at the side thereof.

An object of the invention is to provide side doors for a dump car of the above type, which side doors are supported so that they may each swing about hinges at the upper edge thereof, and so that said side doors may be moved to a position below the floor of the dump car, whereby said dump car may be used as a flat car without any upwardly projecting sides above the floor.

A further object of the invention is to provide a dump car of the above type wherein means is provided for locking the side doors in their raised position, and permitting said doors to swing about the hinge support therefor.

A further object of the invention is to provide means whereby said doors may be held from swinging when in raised position and may also be locked and held from swinging when in lowered position.

These and other objects will in part be obvious and will in part be hereinafter more fully disclosed.

In the drawings which show by way of illustration one embodiment of the invention—

Figure 1 is a transverse sectional view through a dump car embodying my improvements, also showing in dotted lines the body in dumping position;

Fig. 2 is an enlarged detail showing in end view a portion of the body of the car;

Fig. 3 is an enlarged transverse sectional view showing the manner of supporting one of the end members;

Fig. 4 is a similar view but showing the side door lowered;

Fig. 5 is a plan view of a portion of the body;

Fig. 6 is a side view of a portion of the body with the side door in raised position, and Fig. 7 is a similar view showing the side door lowered.

The invention in its broadest aspects is directed to a dump car mounted on trucks adapted to be propelled by steam, electrically or otherwise. The body portion includes a floor, ends and side doors. The body portion is preferably mounted so that it can be moved bodily laterally and then tilted for discharging the contents thereof. For this purpose, I prefer to use a structure similar to that shown in my prior patents Nos. 1,268,829 and 1,268,830, granted June 11, 1918.

It will be noted that the body portion is mounted on traveling rollers or wheels which permits the body portion to be moved laterally and then tilted for discharging the contents thereof. The present invention is directed particularly to the means for mounting the side doors. These side doors are hinged at their upper edges to supporting brackets and are secured in closed position by suitable latches which engage the lower portion of the side doors. When it is desired to tilt the body portion and dump the contents thereof, the latches are released and the doors will swing about their hinges at the upper edges so as to permit the contents to slide from the floor of the body portion. It is at times desirable to use cars of the above type for hauling material which is wider than the floor of the car, and I have therefore constructed the means for supporting the side doors, so that the side doors may be lowered bodily to a position below the floor of the car and secured in such position. This forms a body portion having a floor with no sides extending above the same.

The invention will possibly be better understood by a detail reference to the drawings which show one embodiment thereof. In Fig. 1, I have shown a dump car which includes a body portion 1 mounted on a suitable truck 2. The truck carries bolsters or cross beams 3, and the body portion rests on rollers or wheels 4—4, which are adapted to travel back and forth on the bolster or cross beams 3. It will be noted that the body portion 1 may be moved either to the right or the left as viewed in Fig. 1 to a tiltable position, after which it may be tilted, and one of the other rollers will become the fulcrum support for the body portion of the car, depending upon which side the body portion is moved to. This arrangement of supporting the body portion of a dump car is clearly set forth in my prior patents and further detail description thereof is not thought necessary. The body portion includes a floor 5 which is preferably formed of steel; ends 6 also formed of steel with suitable bracing beams riveted thereto, and doors 7—7 which are likewise formed of steel with suitable U-beams riveted thereto for bracing the same. The side doors are similarly supported, and a description of one of the mountings will serve for both.

At each end of the door, there are supports. Each support consists of a bracket 8 which is pivoted at 9 at a point adjacent the floor of the body portion of the car. Said bracket extends upwardly, and at its upper end is bent slightly forward and is formed with an opening adapted to receive the pivot pin 10. The door is provided with brackets 11 which extend upwardly and are bent inwardly so as to receive the pivot pin 10 and the pivot pin 10 thereby joins the two brackets 8 and 11 and thus forms a hinged support for the door. The door may swing about this hinge support as shown in dotted lines in Fig. 1, to facilitate the emptying of the car when the body portion is tilted.

When the door is moved to closed position as indicated in Fig. 1, it is held in closed position by means of a latch 12. This latch 12 is pivoted at 13 to arms 14 carried by a shaft 15. The shaft 15 at the end of the car has an arm 16 secured thereto, and a hand lever 17 fixed to said arm 16 may be utilized for oscillating the shaft. This arm 16 is pivoted at 18 to a sliding member 19 which operates automatically to release the latch when the body portion is tilted. This latch construction and automatic means for operating the same is all fully disclosed in my prior Patent #1,268,830, and further description thereof is not thought necessary. When the door is in closed position, the latch engages an angle bar 20 secured to the lower edge of the door and projecting beyond the ends thereof.

The brackets 8 which form the hinge supports for the doors are each pivoted at 9. These brackets are pivoted in standards 21 which are U-shape in cross section, and these standards serve to house the brackets 8 when said brackets are in raised position. A locking pin 22 passes through suitable openings in the side walls of the U-shaped standard and through an opening in the bracket member 8 and serve to hold said bracket member rigidly in raised position. When said bracket is thus locked in raised position, the door is free to swing about the hinge connection 10 as an ordinary hinge connection. It is often desirable to use the body portion of the car as a flat car without any upstanding side members. This can be readily accomplished by my improved support for the side doors by removing the pins 22 so that the brackets 8 will swing about their pivotal support 9 to the position shown in Fig. 4. When in this position, it will be noted that the side door is well below the floor 5 of the car. The latches 12 can then be swung so as to engage lugs 23 at the upper edge of the door and as the hinge-point 10 is above where the latch engages the door, the door will be held rigid in this lowered position. It will readily be seen therefore that I have provided a door supporting construction wherein the door may be used as an ordinary hinged door, hinged at the upper end thereof, or said door may be readily moved to a lowered position and rigidly secured which in effect, produces a flat dump car without any sides.

It is obvious that minor changes in the details of construction and the arrangement of the parts may be made without departing from the spirit of the invention as set forth in the appended claims.

Having thus described the invention, what I claim as new and desire to secure by Letters-Patent, is:

1. In a dump car, a body portion having a floor and ends and side doors, and means for supporting said side doors whereby each door may swing about a hinge connection at the upper edge thereof or may move bodily to a position below the floor of the car.

2. In a dump car, a body portion having a floor and ends and side doors, means for supporting said side doors whereby each door may swing about a hinge connection at the upper edge thereof or may move bodily to a position below the floor of the car, and means for locking the door in raised position.

3. In a dump car, a body portion having a floor and ends and side doors, means for supporting said side doors whereby each door may swing about a hinge connection at the upper edge thereof or may move bodily to a position below the floor of the car, means for locking the door in raised position, and means for locking said door in closed position when raised and for securing said door from swinging when lowered.

4. In a dump car, a body portion having a floor and ends and side doors, swinging brackets carried by the body portion and extending above the upper edges of the side doors, brackets rigid with the doors and pivotally connected at their upper ends to said swinging brackets, means for securing said swinging brackets in raised vertical position whereby said brackets serve as a hinge support for the upper edges of the side doors, and means for securing said side doors in raised position.

5. In a dump car, a body portion having a floor and ends and side doors, swinging brackets carried by the body portion and extending above the upper edges of the side doors, brackets rigid with the doors and pivotally connected at their upper ends to said swinging brackets, means for securing said swinging brackets in raised vertical position whereby said brackets serve as a hinge support for the upper edges of the side doors, swinging latches adapted to secure said side doors in closed position, said swinging latches operating to hold said doors from swinging when said swinging brackets are lowered and the side doors are positioned below the floor of the car.

6. In a dump car, a body portion having a floor and ends and side doors, swinging brackets pivotally mounted on said body portion at points adjacent the floor of the body portion, said brackets being adapted to extend upwardly to a position above the side doors when said side doors are raised and closed, locking means for holding said brackets in raised position, brackets rigidly secured to the door and hinged to said swinging brackets at their upper ends whereby said side doors may swing about said brackets when in raised position.

7. In a dump car, a body portion having a floor and ends and side doors, swinging brackets pivotally mounted on said body portion at points adjacent the floor of the body portion, said brackets being adapted to extend upwardly to a position above the side doors when said side doors are raised and closed, locking means for holding said brackets in raised position, brackets rigidly secured to the door and hinged to said swinging brackets at their upper ends whereby said side doors may swing about said brackets when in raised position, and means for rigidly holding said brackets and said side doors when in lowered position.

8. In a dump car, a body portion having a floor and ends and side doors, brackets pivotally mounted on said body portion at points adjacent said floor and extending upwardly to points above the side doors when said side doors are raised and closed, brackets rigidly secured to the side doors and extending above the upper edges thereof and pivotally attached to the swinging brackets, means for securing said swinging brackets in raised position whereby the same serve as a rigid hinge support for the side doors, latches for engaging the lower portion of the side doors when raised for holding the same closed, said latches also being adapted to engage the upper edges of the side doors when said side doors are lowered for preventing the side doors from swinging on their pivotal connection to the swinging brackets.

In testimony whereof, I affix my signature.

HENRY FORT FLOWERS.